United States Patent
Arai

(10) Patent No.: US 9,738,120 B2
(45) Date of Patent: Aug. 22, 2017

(54) PNEUMATIC TIRE

(71) Applicant: Sumitomo Rubber Industries Ltd., Kobe-shi, Hyogo (JP)

(72) Inventor: Hiroshi Arai, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 310 days.

(21) Appl. No.: 14/666,749

(22) Filed: Mar. 24, 2015

(65) Prior Publication Data
US 2015/0273949 A1 Oct. 1, 2015

(30) Foreign Application Priority Data

Mar. 25, 2014 (JP) .................................. 2014-062421
Oct. 3, 2014 (JP) .................................. 2014-205068

(51) Int. Cl.
B60C 11/03 (2006.01)
B60C 11/12 (2006.01)
(Continued)

(52) U.S. Cl.
CPC ........... *B60C 11/0316* (2013.01); *B60C 11/11* (2013.01); *B60C 11/1204* (2013.01);
(Continued)

(58) Field of Classification Search
CPC . B60C 11/0316; B60C 11/11; B60C 11/1369; B60C 11/1263; B60C 11/1281;
(Continued)

(56) References Cited

U.S. PATENT DOCUMENTS 5,010,936 A * 4/1991 Numata .................. B60C 11/01
152/209.14
7,077,181 B2 * 7/2006 Hirai ................... B60C 11/0318
152/209.18
(Continued)

FOREIGN PATENT DOCUMENTS

CH         561 615 A5     5/1975
EP       2 653 320 A2    10/2013
(Continued)

OTHER PUBLICATIONS

Partial European Search Report, dated Aug. 20, 2015, for European Application No. 15160007.9.

*Primary Examiner* — Eric Hug
(74) *Attorney, Agent, or Firm* — Birch, Stewart, Kolasch & Birch, LLP

(57) ABSTRACT

A pneumatic tire includes a tread portion provided with a circumferentially extending zigzag shoulder main groove arranged proximate to a tread edge, and a plurality of shoulder lateral grooves each extending axially outwardly from the shoulder main groove. Each of the shoulder lateral grooves includes a first portion and second portion. The first portion includes a first groove wall and an axially inner end connected to the shoulder main groove. The second portion is arranged axially outward of the first portion and includes a second groove wall. The second portion has a groove width and a groove depth greater than those of the first portion. The first groove wall of the first portion and the second groove wall of the second portion are smoothly continued.

19 Claims, 7 Drawing Sheets

(51) Int. Cl.
*B60C 11/13* (2006.01)
*B60C 11/11* (2006.01)

(52) U.S. Cl.
CPC ...... *B60C 11/1263* (2013.01); *B60C 11/1281* (2013.01); *B60C 11/13* (2013.01); *B60C 11/1369* (2013.01); *B60C 2011/0346* (2013.01); *B60C 2011/0358* (2013.01); *B60C 2011/0365* (2013.01); *B60C 2011/0367* (2013.01); *B60C 2011/1254* (2013.01)

(58) Field of Classification Search
CPC ............... B60C 11/13; B60C 11/1204; B60C 2011/1254; B60C 2011/0358; B60C 2011/0365; B60C 2011/0367; B60C 2011/0346; B60C 11/0306; B60C 11/0309; B60C 11/0311; B60C 11/0369; B60C 11/0372; B60C 11/0374; B60C 11/0376; B60C 11/0379; B60C 11/042
USPC ............ 152/209.3, 209.13, 209.16, 209.18, 152/209.25, 900, 903
See application file for complete search history.

(56) References Cited

U.S. PATENT DOCUMENTS

| | | | | |
|---|---|---|---|---|
| 7,673,663 | B2* | 3/2010 | Murata | B60C 11/0083 152/209.15 |
| 7,762,297 | B2* | 7/2010 | Takahashi | B60C 11/0306 152/209.18 |
| 2013/0160909 | A1* | 6/2013 | Atake | B60C 11/0311 152/209.25 |
| 2013/0269846 | A1* | 10/2013 | Koyama | B60C 11/03 152/209.18 |
| 2014/0230982 | A1* | 8/2014 | Ninomiya | B60C 11/0306 152/209.22 |

FOREIGN PATENT DOCUMENTS

| | | |
|---|---|---|
| JP | 5-278415 A | 10/1993 |
| JP | 11-196612 A | 7/1999 |

\* cited by examiner

PNEUMATIC TIRE

BACKGROUND ART

Field of the Invention

The present invention is related to a pneumatic tire designed for excellent performance in mud terrain and quiet ride on paved road.

Description of the Related Art

Japanese unexamined patent application publication No. 5-278415 discloses an all terrain pneumatic tire that comprises a tread portion provided with a circumferentially extending zigzag main groove and a plurality of broad shoulder lateral grooves extending axially outwardly from the shoulder main groove to form a plurality of shoulder blocks. In mud terrain, the respective shoulder blocks generate traction force by shearing large lump of mud pressed in the shoulder lateral grooves.

Unfortunately, the tire disclosed by the publication tends to produce a large pumping noise on paved road due to the air passing through the shoulder lateral grooves in a ground contacting patch of the tread.

SUMMARY OF THE INVENTION

The present invention has been worked out in the light of the circumstances described above, and has a main object of providing a pneumatic tire designed for excellent performance in mud terrain and quiet ride on paved road.

According to one aspect of the present invention, a pneumatic tire includes a tread portion having a tread edge. The tread portion is provided with a circumferentially extending zigzag shoulder main groove arranged proximate to the tread edge, and a plurality of shoulder lateral grooves each extending axially outwardly from the shoulder main groove. Each of the shoulder lateral grooves includes a first portion and second portion. The first portion has an axially inner end connected to the shoulder main groove and a first groove wall. The second portion is arranged axially outward of the first portion and has a second groove wall. The second portion has a groove width and a groove depth greater than those of the first portion. The first groove wall of the first portion and the second groove wall of the second portion are smoothly continued.

In another aspect of the invention, the shoulder main groove may include a first inclined element and a second inclined element inclined in an opposite direction to the first inclined element, and the first portion may be connected to the first inclined element and may be inclined in the same direction of the second inclined element.

In another aspect of the invention, the respective angles of the first inclined element and the second inclined element may be in a range of from 30 to 40 degrees with respect to a circumferential direction of the tire.

In another aspect of the invention, the first inclined element may include a narrow portion and a broad portion having a width greater than that of the narrow portion, the broad portion may be arranged axially outward of the narrow portion, and the first portion may be connected to the broad portion.

In another aspect of the invention, the tread portion may further include a plurality of shoulder blocks each of which is arranged between the shoulder lateral grooves. Each of the shoulder blocks may be provided with a shoulder narrow groove having a groove width smaller than that of the shoulder lateral grooves, and the shoulder narrow groove may extend along the shoulder lateral groove.

In another aspect of the invention, at least one of the shoulder blocks may be provided with a shoulder sipe having a width smaller than that of the shoulder narrow groove, and the shoulder sipe may be arranged axially inwardly of the shoulder narrow groove.

In another aspect of the invention, the shoulder sipe may be arranged so as to connect the shoulder main groove with the first portion of the shoulder lateral groove.

In another aspect of the invention, the shoulder sipe may be arranged so as to connect the shoulder main groove with the shoulder narrow groove.

In another aspect of the invention, the shoulder sipe may be arranged so as to connect the shoulder narrow groove with the first portion of the shoulder lateral groove.

In another aspect of the invention, the shoulder sipe may be arranged so as to connect among the shoulder main groove, the first portion of the shoulder lateral groove and the shoulder narrow groove.

In another aspect of the invention, the first portion of the shoulder lateral groove may be connected to the first inclined element so as to form a T-shaped intersection.

In another aspect of the invention, the axially inner end of the first portion of the shoulder lateral groove may be located axially inward of an extension line of an axially inner groove edge of the second inclined element of the shoulder main groove.

In another aspect of the invention, a distance between the extension line and the axially inner end of the first portion of the shoulder lateral groove may be not more than 4.0 mm.

In another aspect of the invention, the shoulder main groove may include an axially outer zigzag peak, and the axially outer zigzag peak may include an axially outer groove edge extending along a circumferential direction of the tire.

In another aspect of the invention, the first portion may be inclined at an angle in a range of from 30 to 40 degrees with respect to a circumferential direction of the tire.

In another aspect of the invention, the shoulder lateral groove may have a groove depth in a range of from 80% to 90% of that of the shoulder main groove.

DESCRIPTION OF THE PREFERRED EMBODIMENTS

Figure 1:
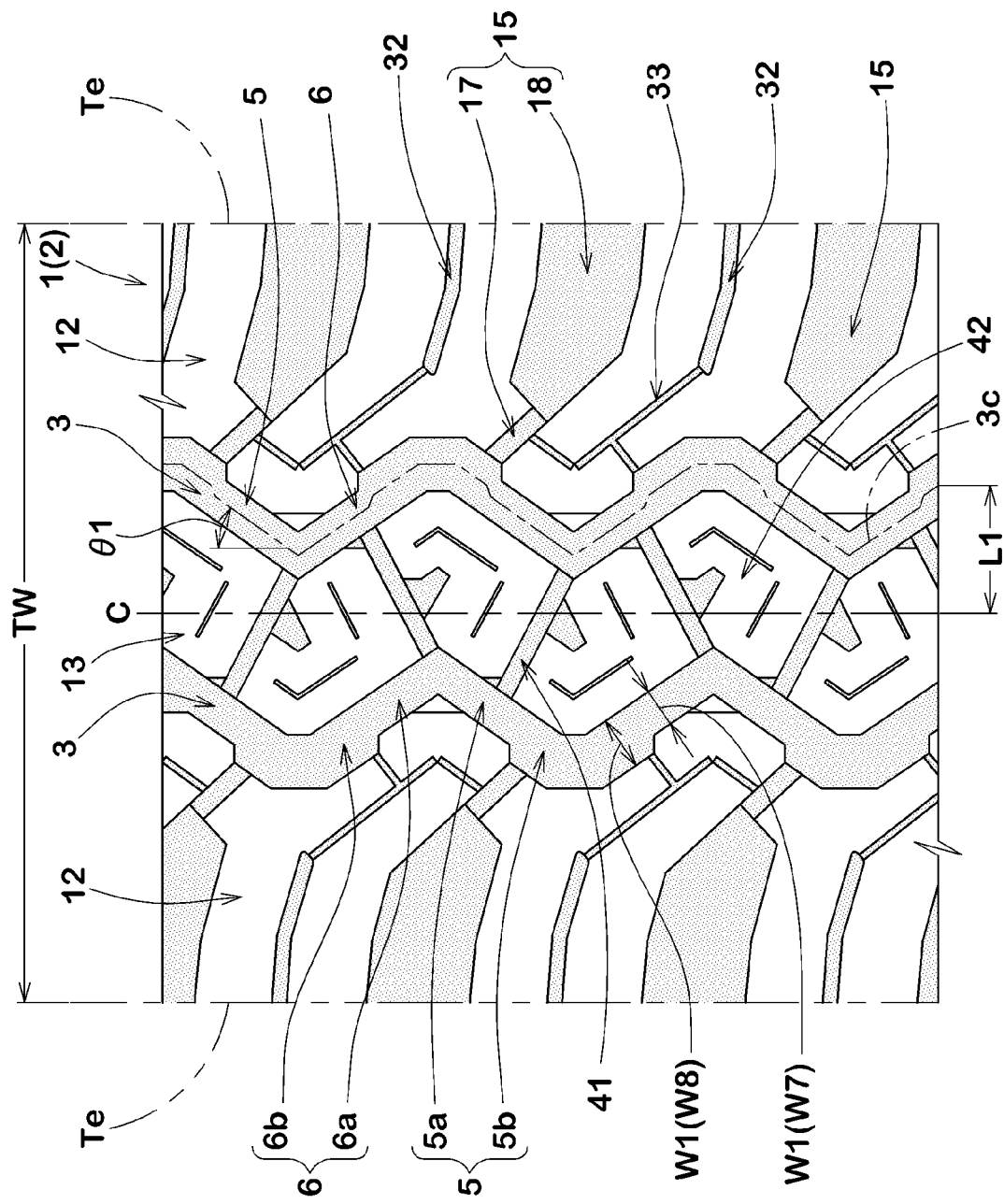
FIG. 1 is a development view of a tread portion of a pneumatic tire in accordance with an embodiment of the present invention.

An embodiment of the present invention will be explained below with reference to the accompanying drawings. FIG. 1 illustrates a development view of a tread portion 2 of a pneumatic tire 1 in accordance with an embodiment of the present invention. The tire 1 in accordance with the present embodiment is embodied as an all terrain tire for SUV or the like.

As shown in FIG. 1, the tire 1 includes a tread portion 2 provided with a pair of shoulder main grooves 3 and 3. In this embodiment, the pair of shoulder main grooves 3 and 3 have substantially same zigzag pitch and are arranged to align each zigzag phase.

The tread portion 2 includes a pair of tread edges Te to define a tread ground contacting width TW therebetween. The tread edges Te are defined as axially outer edges in a ground contact patch of the tread portion 2 under a standard loaded condition in which the tire 1 is mounted on a standard wheel rim (not shown) with a standard pressure and is loaded with a standard tire load at a camber angle of set to zero.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

The tread ground contacting width TW is an axial distance between the tread edges Te in a standard unloaded condition. The standard unloaded condition is such that the tire 1 is mounted on the standard wheel rim with the standard pressure and is loaded with no tire load. In this application including specification and claims, various dimensions, positions and the like of the tire refer to those under the standard unloaded condition of the tire unless otherwise noted.

Each of the shoulder main grooves 3 is arranged proximate to the tread edge Te on each side of the tire equator C and continuously extends in a zigzag manner in a circumferential direction of the tire.

Each of the shoulder main grooves 3 includes a first inclined element 5 and a second inclined element 6 that is inclined in an opposite direction to the first inclined element 5. The first inclined element 5 and the second inclined element 6 are alternately arranged in the circumferential direction of the tire. In this embodiment, the first inclined element 5 and the second inclined element 6 have the substantially same length one another.

The first inclined element 5, for example, includes a narrow portion 5a and a broad portion 5b having a width greater than that of the narrow portion 5a and arranged axially outward of the narrow portion 5a. Similarly, the second inclined element 6, for example, includes a narrow portion 6a and a broad portion 6b having a width greater than that of the narrow portion 6a and arranged axially outward of the narrow portion 6a.

The narrow portion 5a of the first inclined element 5 is connected to the narrow portion 6a of the second inclined element 6 one another so as to form an axially inner zigzag peak. The broad portion 5b of the first inclined element 5 is connected to the broad portion 6b of the second inclined element 6 one another so as to form an axially outer zigzag peak.

Such configuration having the narrow portions 5a and 6a and the broad portions 5b and 6b may provide large amount of rubber volume in the central area of the tread portion 2 to improve steering stability on paved road while offering a large groove volume in the shoulder area of the tread portion 2 to improve performance in mud terrain.

In order to further improve the advantage described above, the ratio W7/W8 of the groove width W7 of the narrow portions 5a and 6a to the groove width W8 of the broad portions 5b and 6b is preferably in a range of not less than 0.65, more preferably not less than 0.70, but preferably not more than 0.80, more preferably not more than 0.75.

Preferably, the respective angles 81 of the first inclined element 5 and the second inclined element 6 with respect to a circumferential direction of the tire, for example, are in a range of from 10 to 45 degrees, more preferably in a range of from 30 to 40 degrees to increase friction not only in lateral direction but also in circumferential direction against the road during traveling.

The shoulder main groove 3, for example, has a groove width W1 in a range of from 3.0% to 8.0% of the tread ground contacting width TW to improve not only steering stability on paved road but also performance in mud terrain. Preferably, the shoulder main groove 3 for SUV tire, for example, has a groove depth in a range of from 8 to 15 mm.

In order to offer excellent performance in mud terrain as well as high rigidity on the tread portion 2, the axial distance L1 from the tire equator C to the groove centerline 3c of the shoulder main groove 3 varies along the circumferential direction of the tire in a range of from 5% to 20% of the tread ground contacting width TW.

The tread portion 2 is divided into a pair of shoulder portions 12 each arranged axially outside the shoulder main grooves 3 and a central portion 13 arranged between the shoulder main grooves 3.

Figure 2:
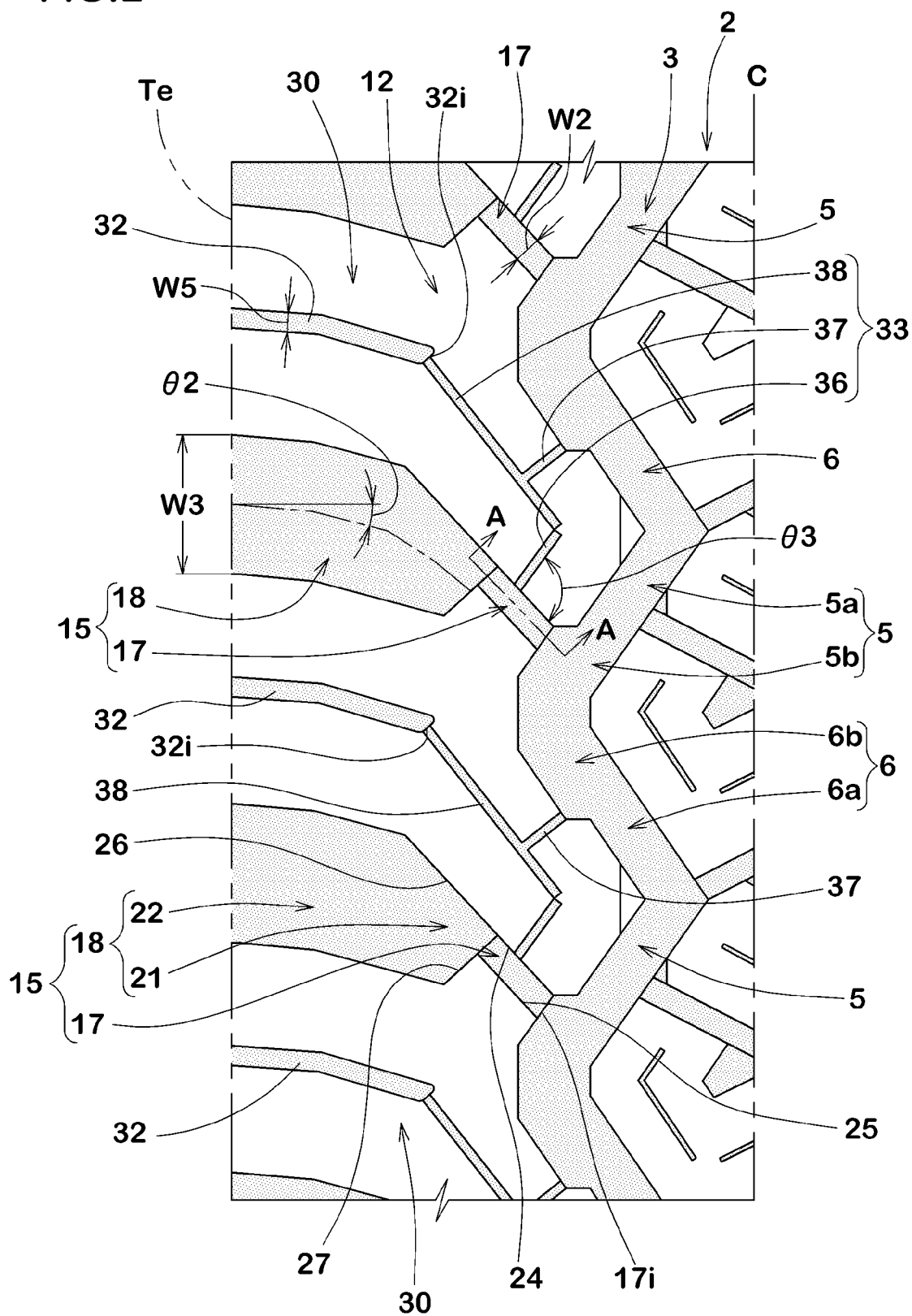
FIG. 2 is an enlarged view of a shoulder portion of FIG. 1.

FIG. 2 illustrates an enlarged view of one of the shoulder portions 12. As shown in FIG. 2, the shoulder portion 12 is provided with a plurality of shoulder lateral grooves 15 extending axially outwardly from the shoulder main groove 3.

Each of the shoulder lateral grooves 15 extends from the shoulder main groove 3 to the tread edge Te at least. Thus the shoulder portion 12 is divided into a plurality of shoulder blocks 30.

The shoulder lateral groove 15 includes a first portion 17 and a second portion 18 arranged axially outward of the first portion 17.

The first portion 17 includes an axially inner end 17i that is connected to the shoulder main groove 3 and a first groove wall 24. Preferably, the axially inner end 17i of the first portion 17 may be connected to any place of the shoulder main groove except the axially outer zigzag peak. In this embodiment, the axially inner end 17i of the first portion 17 is connected to the first inclined element 5, and more preferably is connected to the broad portion 5b of the first inclined element 5. Since the air pressure passing through the broad portion 5b during traveling is relatively low, the first portion 17 may reduce sound levels of the pumping noise generated through the shoulder lateral grooves 15.

The first portion 17, for example, is inclined in the same direction of the second inclined element 6 of the shoulder main groove 3. In this embodiment, the first portion 17 extends along the second inclined element 6 in a straight manner. On wet road, the water flowing in the second inclined element 6 easily enters into the first portion 17 using its inertia, and then the water is discharged through the tread edge Te.

Preferably, the groove width W2 of the first portion 17 is in a range of from 4.0 to 8.0 mm, more preferably in a range of from 5.0 to 7.0 mm. In this embodiment, the first portion 17 has a constant groove width. Preferably, the groove depth of the first portion 17 is in a range of from 6.0 to 9.0 mm.

The second portion 18 extends between the first portion 17 and the tread edge Te. The second portion 18 is preferably inclined at angle θ2 of from 0 to 30 degrees with respect to the axial direction of the tire. In the preferred embodiment, the angle θ2 of the second portion 18 is gradually decreasing toward the tread edge Te.

The second portion 18 has a groove width greater than that of the first portion 17. The groove width W3 at the tread edge Te of the second portion 18, for example, is in a range of from 3.5 to 6.0 times, more preferably in a range of from 4.5 to 5.0 times the groove width W2 of the first portion 17.

In the preferred embodiment, the second portion 18 includes an axially inner portion 21 having a groove width gradually increasing axially outward and an axially outer portion 22 having substantially a constant groove width. Such a second portion may enhance the rigidity of the tread portion 2 while improving performance in mud terrain and wet paved road.

Figure 3:
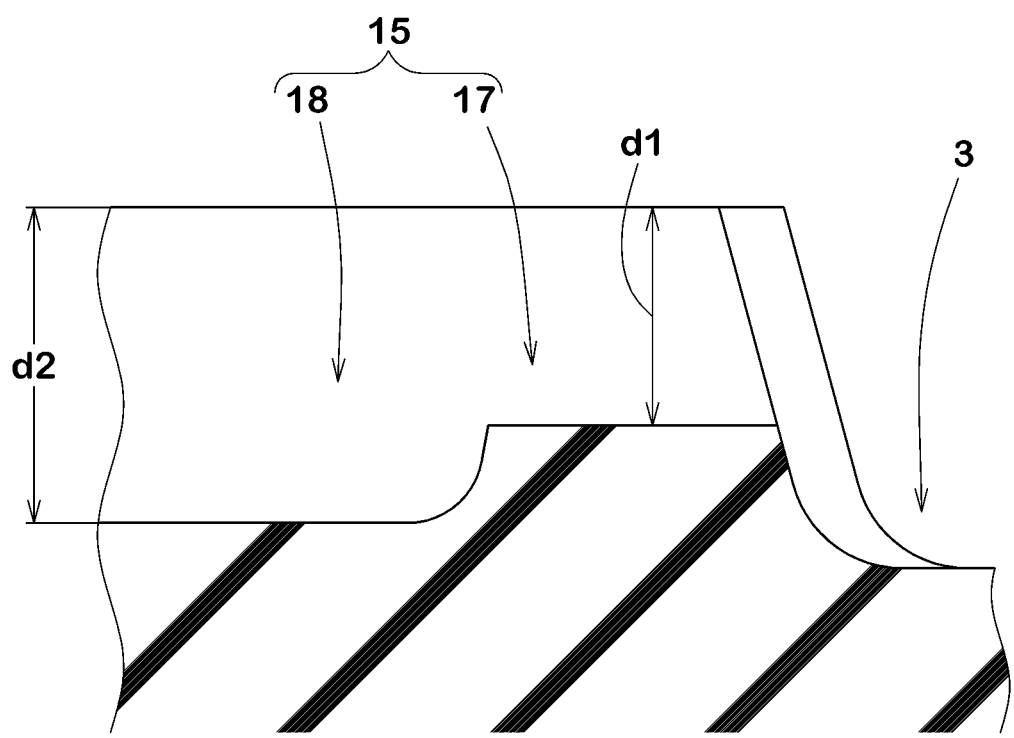
FIG. 3 is a cross sectional view taken along a line A-A of FIG. 2.

FIG. 3 illustrates a cross sectional view taken along a line A-A of FIG. 2. As shown in FIG. 3, the second portion 18 has a groove depth d2 greater than that of the first portion 17. The groove depth d2 of the second portion 18 is preferably in a range of from 1.25 to 1.65 times, more preferably in a range of from 1.45 to 1.50 times the groove depth d1 of the first portion 17. Such a shoulder lateral groove 15 may reduce sound levels of pumping noise generated through the shoulder lateral groove 15 by restricting the amount of the air passing through the first portion 17.

As shown in FIG. 2, the first groove wall 24 of the first portion 17 and the second groove wall 26 of the second portion 18 are smoothly continued so as to form a single groove wall or a common plane. The air entering into the shoulder lateral groove 15 during traveling on paved road may be smoothly guided toward the tread edge Te by the two continued groove walls 24 and 16 without generating turbulent flow in the shoulder lateral groove 15. Thus the pumping noise may be reduced since momentary increase of the air pressure in the shoulder lateral grooves 15 may be prevented when the tire is in contact with the paved road. In this embodiment, the first groove wall 24 of the first portion 17 and the second groove wall 26 of the second portion 18 are continued to form a continuous straight groove edge, thereby further improving the effect described above.

The first portion 17 of the shoulder lateral groove 15 further includes a third groove wall 25. The second portion 18 of the shoulder lateral groove 15 further includes a fourth groove wall 27 that is connected to the third groove wall 25 so as to form a step-like shape.

The shoulder block 30 is provided with a shoulder narrow groove 32 and a shoulder sipe 33. In this disclosure, a sipe means an incision having a width of from 0.5 to 1.5 mm. On the other hand, a groove has a width larger than that of the sipe.

The shoulder narrow groove 32, for example, is arranged between the adjacent second portions 18 and 18 and extends along the second portion 18. The shoulder narrow groove 32 may prevent the shoulder block 30 from chipping or uneven wear while improving performance in mud terrain.

The shoulder narrow groove 32 has a groove depth W5 smaller than that of the first portion 17 of the shoulder lateral groove 15. Preferably, the groove depth W5 is set in a range of not less than 0.60 times, more preferably not less than 0.65 times, but preferably not more than 0.75 times, more preferably not more than 0.70 times the groove width W2 of the first portion 17 in order to improve steering stability on paved road as well as performance in mud terrain.

The shoulder sipe 33, for example, is arranged axially inwardly of the shoulder narrow groove 32. In this embodiment, the shoulder sipe 33 may include a first sipe element 36 having one end connected to the first portion 17, a second sipe element 37 having one end connected to the shoulder main groove 3 and a third sipe element 38 having one end connected to the shoulder narrow groove 32. Thus, the shoulder sipe 33 is configured to connect among the shoulder narrow groove 32, the first portion 17 of the shoulder lateral groove 15 and the shoulder main groove 3. Such configuration of sipe may exhibit a high grip against a hard off-road terrain by offering various directional sipe edges.

The first sipe element 36 is inclined at angle θ3 of from 75 to 90 degrees with respect to the first portion 17. The first sipe element 36 extends along the first inclined element 5 in a straight manner from the first portion 17, and terminates within the shoulder block 30.

The second sipe element 37, for example, extends along the first inclined element 5 of the shoulder main groove 3 in a straight manner from the broad portion 6b of the second inclined element 6 of the shoulder main groove 3.

The third sipe element 38, for example, extends along the second inclined element 6 of the shoulder main groove 3 in a straight manner from the axially inner end 32i of the shoulder narrow groove 32.

The third sipe element 38, for example, terminates within the shoulder block 30. Alternatively, the third sipe element 38, for example, may be connected to the first sipe element 36.

Desirably, the third sipe element 38 is connected to the second sipe element 37 so as to form a T-shaped junction. This configuration makes it possible to reduce the air pressure in the shoulder main groove 3 during traveling by releasing the air in the shoulder main groove 3 into the shoulder narrow groove 32, thereby further reducing the pumping noise.

Figure 4:
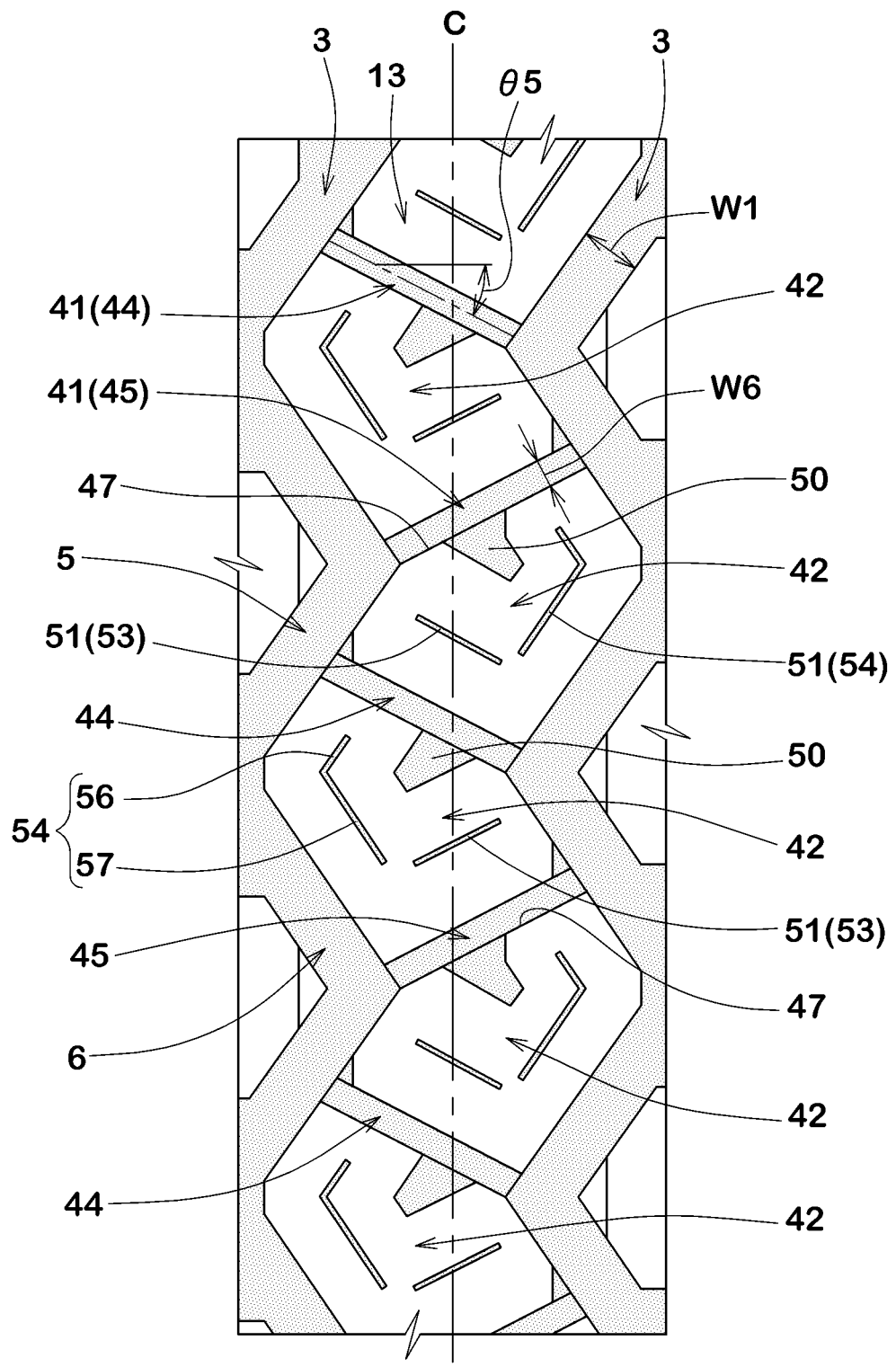
FIG. 4 is an enlarged view of a central portion of FIG. 1.

FIG. 4 illustrates an enlarged view of the central portion 13 of the read portion 2. As shown in FIG. 4, the central portion 13 is provided with a plurality of central lateral grooves 41 each extending between the shoulder main grooves 3 and 3 so as to form a plurality of central blocks 42.

The central lateral grooves 41 include a first central lateral groove 44 inclined with respect to the axial direction of the tire and a second central lateral groove 45 inclined in an opposite direction to the first central lateral groove 44. The first central lateral groove 44 and the second central lateral groove 45 are arranged alternately in the circumferential direction of the tire. On wet paved road, the central lateral grooves 41 may effectively dispel the water from under the central portion 13 and may send it to both shoulder main grooves 3.

Preferably, each of the central lateral grooves 41 has an angle θ5 in a range of not less than 20 degrees, more preferably not less than 25 degrees, but preferably not more than 35 degrees, more preferably not more than 30 degrees with respect to the axial direction of the tire to further improve performance on wet paved road.

In this embodiment, each of the central lateral grooves 41 has a groove width W6 smaller than that of the shoulder main groove 3. The groove width W6 of the central lateral groove 41 is preferably in a range of from 0.3 to 0.5 times the groove width W1 of the shoulder main groove 3 to further improve performance on both dry and wet road conditions.

Each of the central blocks 42 is provided with a recess 50 and a plurality of central sipes 51. The recess 50 is formed on a sidewall 47 of the central block 42 which faces one of the central lateral grooves 41. In this embodiment, each of the central sipes 51 has both ends that terminate within the central block 42. Each of the central blocks 42, for example, includes a top surface shaped substantially pentagonal outline except for the recess 50.

The recess 50 has a width measured along the longitudinal direction of the central lateral groove 41. Preferably, the width of the recess 50 is gradually decreasing toward inside the central block 42 in order to improve performance in mud terrain by compressing the mud.

The central sipes 51, for example, include a first central sipe 53 that extends in a straight manner and a second central sipe 54 that extends in a bent manner.

The first central sipe 53 extends along the first central lateral grooves 44 or the second central lateral groove 45. The second central sipe 54, for example, includes a first sipe portion 56 extending along the first inclined element 5 of the shoulder main groove 3 and a second sipe portion 57 extending along the second inclined element 6 of the shoulder main groove 3. The first central sipe 53 and the second central sipe 54 are provided apart from one another.

The second central sipes 54 may increase the length of edges on the top surface of the central block 42 without deteriorating the block rigidity so that high uneven wear resistance of the central block 42 and excellent performance in mud terrain may be offered.

Figure 6:
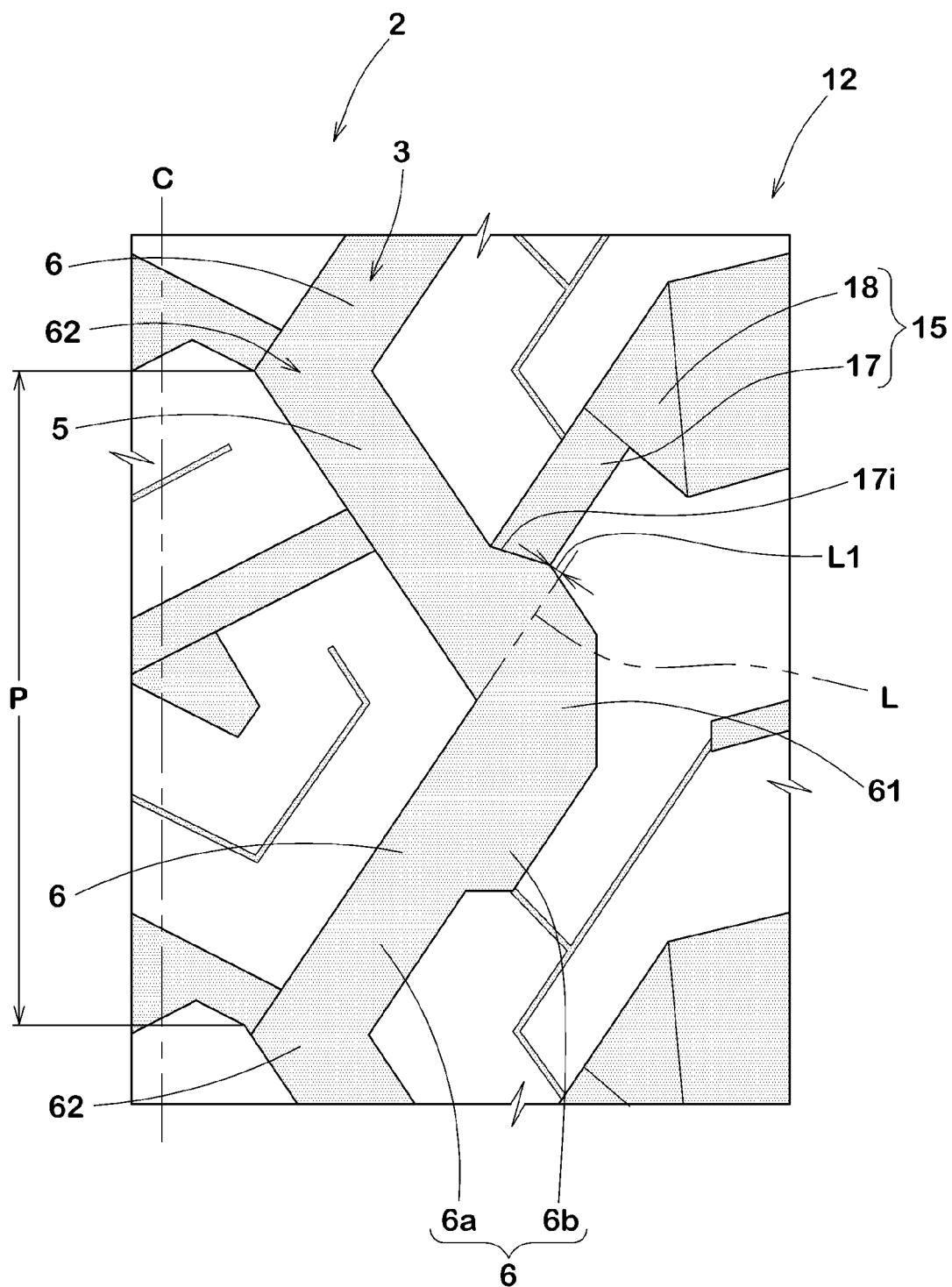
FIG. 6 is an enlarged view of a shoulder portion of a tread portion in accordance with another embodiment of the present invention.

FIG. 6 illustrates an enlarged view of the shoulder portion 12 of the tread portion in accordance with another embodiment of the present invention. In the preferred embodiment, the axially inner end 17*i* of the first portion 17 of the shoulder lateral groove 15 is connected to the first inclined element 5 so as to form a T-shaped intersection.

The shoulder main groove 3 includes a plurality of zigzag peak portions 61 and 62 where the air flowing during traveling on paved road changes its direction. When the shoulder lateral groove 15 is connected to such a zigzag peak portion of the shoulder main groove 3, the air may easily enters into the shoulder lateral groove 15 and then a large traveling noise may be generated. In this embodiment, since the shoulder lateral groove 15 is connected with the first inclined element 5 so as to form the T-shaped intersection. In other words, the axially inner end 17*i* of the first portion 17 is located so as not to overlap the region in which the second inclined element 6 is projected axially outwardly along its longitudinal direction. Since the amount of air coming from the shoulder main groove 3 into the shoulder lateral groove 15 during traveling is reduced, the tire 1 in accordance with the present embodiment may reduce the traveling noise.

The axially inner end 17*i* of the first portion 17 of the shoulder lateral groove 15 is located axially inside of an extension line L in which an axially inner groove edge of the second inclined element 6 of the shoulder main groove 3 is extended axially outwardly. As detailed above, since such a configuration may reduce the amount of air coming from the shoulder main groove 3 into the shoulder lateral groove 15 during traveling, the traveling noise may further be reduced.

Preferably, a distance L1 between the extension line L and the axially inner end 17*i* of the first portion 17 of the shoulder lateral groove 15 is in a range of not more than 4.0 mm in order to ensure excellent performance on mud terrain.

Figure 7:
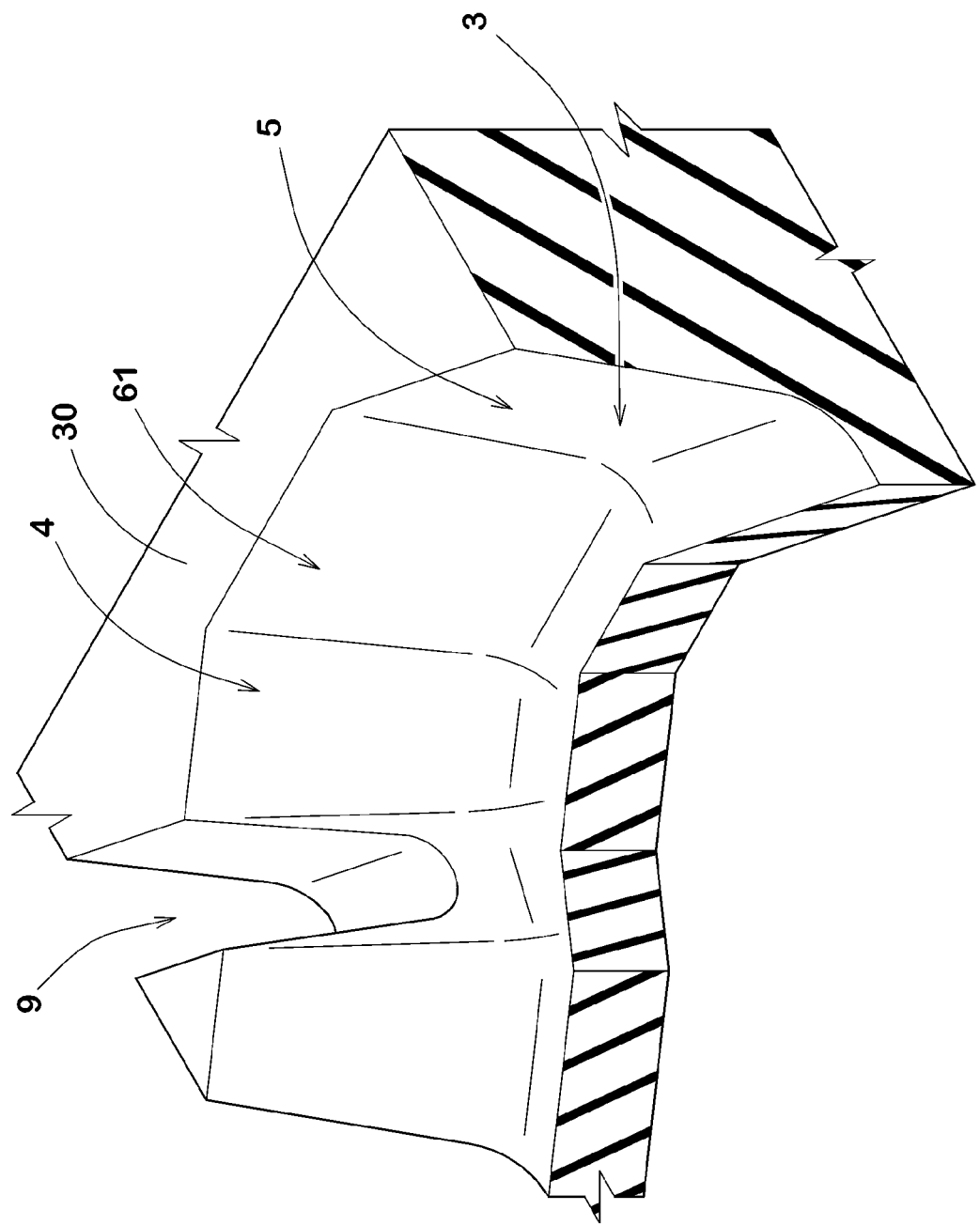
FIG. 7 is a perspective view of a portion around an axially outer zigzag peak of a shoulder main groove.

FIG. 7 is a perspective view of a portion around the axially outer zigzag peak 61 of the shoulder main groove 3. As shown in FIGS. 6 and 7, the axially outer zigzag peak 61 comprises an axially outer groove edge extending along a circumferential direction of the tire. The air passing through such a shoulder main groove 3 may be gradually changed its flowing direction by the first inclined element 15, the axially outer zigzag peak 61 and the second inclined element 6, and in particular it may flow perpendicular to the longitudinal direction of the first portion 17 so that the inflow of the air into the first portion 17 is reduced.

While the particularly preferable embodiments of the present invention have been described in detail, the present invention is not limited to the illustrated embodiments, but can be modified and carried out in various aspects.

Comparison Test

First Embodiment

Pneumatic tires for SUV having a size of 225/95R16 and a basic tread pattern shown in FIG. 1 were manufactured based on specifications in Table 1. The tire of Ref 1 listed in Table 1 is configured to have the tread pattern of FIG. 5 so that the first portion and second portion of each shoulder lateral groove have the same groove depth and the respective both groove walls are connected as a step-like manner. Then, noise and performance in mud terrain were tested. The test methods and common specifications of tire or the like are as follows.

Rim size: 16×5.5

Inner pressure: 220 kPa

Test vehicle: Four-wheel-drive car with 3,600 cc displacement

Tire installed position: All the wheels

Performance in Mud Terrain Test:

The test vehicle was made to run on mud terrain, and then the driver evaluated its traveling performance by his feeling. The results were indicated using a score, wherein the Ref 1 is being 100. The larger the value, the better the performance is.

Noise Performance Test:

While the test vehicle as mentioned above was run on a noise test course with a rough asphalt paved surface at a speed of 100 km/hr, noise sound was measured in the inside of the car under the following conditions. The results were indicated the reciprocal of the sound pressure level using an index, wherein the tire of Ref 1 is being 100. The larger the value, the better the performance is.

Measuring position: Near the driver's ear on the window side of the vehicle

Measured: Sound pressure level of a peak occurring at a frequency near 240 Hz.

The test results are shown in Table 1. From the test result of Table 1, it was confirmed that the example tires can improve both of noise performance and performance in mud terrain.

TABLE 1

Figure 5:
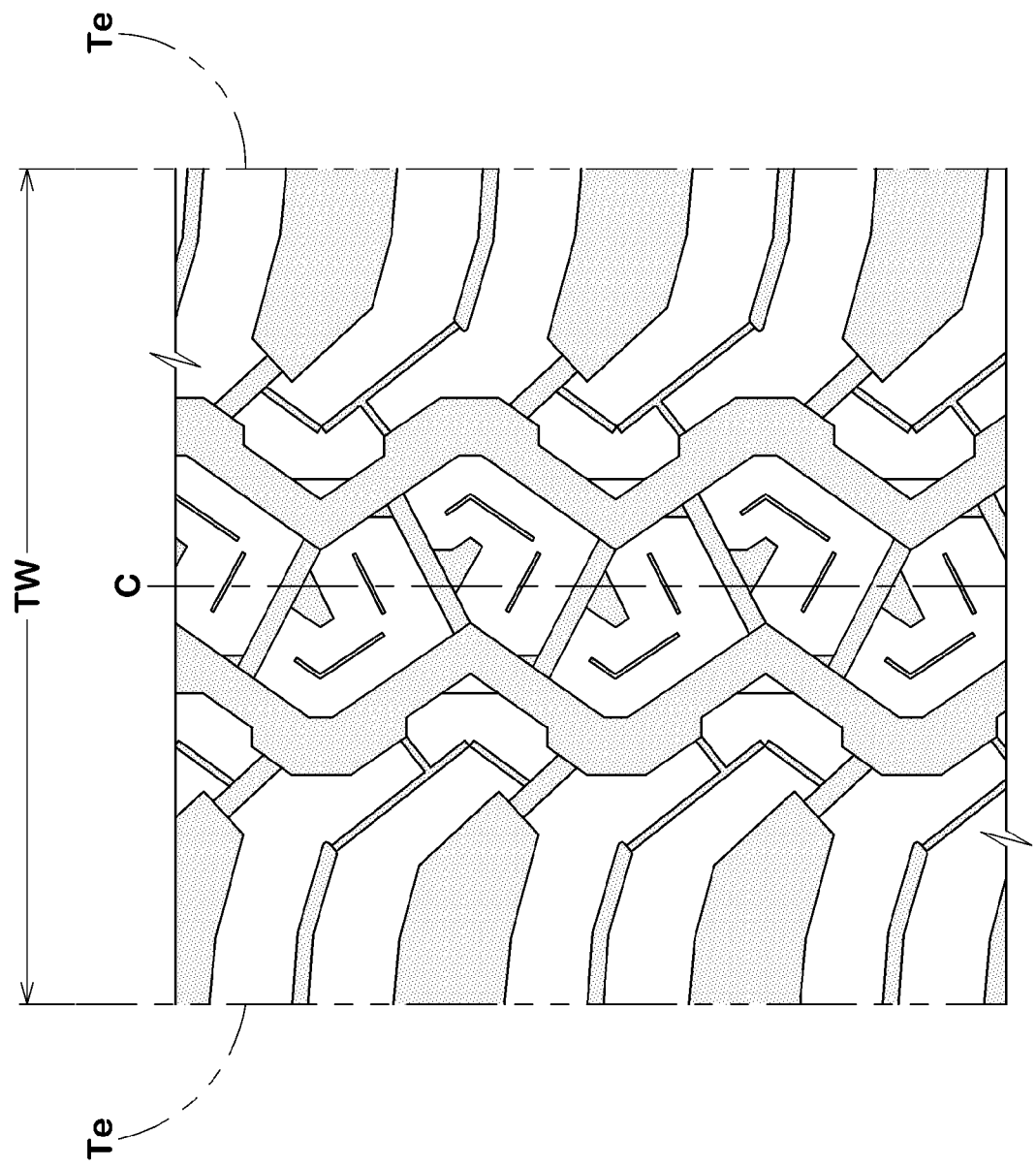
FIG. 5 is a development view of a tread portion of a reference tire.

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Tread pattern | FIG. 5 | FIG. 1 | FIG. 1 | FIG. 1 | FIG. 1 | FIG. 1 | FIG. 1 | FIG. 1 |
| Width of narrow portion of shoulder main groove W7 (mm) | 8.0 | 8.0 | 6.0 | 10.0 | 8.0 | 8.0 | 8.0 | 8.0 |
| Width of broad portion of shoulder main groove W8 (mm) | 12.0 | 12.0 | 12.0 | 12.0 | 12.0 | 12.0 | 8.0 | 16.0 |
| Width of first portion W2 (mm) | 6.0 | 6.0 | 6.0 | 6.0 | 4.0 | 8.0 | 6.0 | 6.0 |
| Depth of first portion d1 (mm) | 11.0 | 7.5 | 7.5 | 7.5 | 7.5 | 7.5 | 7.5 | 7.5 |
| Width of second portion W3 (mm) | 25.0 | 25.0 | 25.0 | 25.0 | 25.0 | 25.0 | 25.0 | 25.0 |
| Depth of second portion d2 (mm) | 11.0 | 11.0 | 11.0 | 11.0 | 11.0 | 11.0 | 11.0 | 11.0 |
| Mud performance (Score) | 100 | 100 | 98 | 102 | 101 | 99 | 98 | 98 |
| Noise performance (Index) | 100 | 108 | 108 | 106 | 106 | 110 | 106 | 110 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 |
| Width of narrow portion of shoulder main groove W7 (mm) | 8.0 | 12.0 | 12.0 | 8.0 | 8.0 | 8.0 | 8.0 | 8.0 |
| Width of broad portion of shoulder main groove W8 (mm) | 12.0 | 12.0 | 16.0 | 12.0 | 12.0 | 12.0 | 12.0 | 12.0 |
| Width of first portion W2 (mm) | 6.0 | 6.0 | 6.0 | 6.0 | 6.0 | 6.0 | 6.0 | 4.0 |
| Depth of first portion d1 (mm) | 4.0 | 4.0 | 4.0 | 7.5 | 7.5 | 7.5 | 7.5 | 4.0 |
| Width of second portion W3 (mm) | 25.0 | 25.0 | 25.0 | 18.0 | 22.0 | 25.0 | 25.0 | 25.0 |
| Depth of second portion d2 (mm) | 11.0 | 11.0 | 11.0 | 11.0 | 11.0 | 9.0 | 14.0 | 14.0 |
| Mud performance (Score) | 98 | 98 | 99 | 98 | 98 | 100 | 102 | 98 |
| Noise performance (Index) | 106 | 110 | 107 | 109 | 110 | 109 | 106 | 108 |

Second Embodiment

Pneumatic tires for SUV having a size of 225/95R16 and a basic tread pattern shown in FIG. 6 were manufactured based on specifications in Table 2. The tire of Ref 2 listed in Table 2 is configured that the axially inner end faces the second portion with an overlap at the distance L1. The test methods and common specifications of tire or the like are as follows.

Noise Performance Test:

According to the "Test Procedure for Tire Noise" specified in Japanese JASO C606, the test vehicle as mentioned above was coasted at a speed of 60 km/hr in a straight test course, and the maximum noise sound level dB(A) was measured with a microphone set at 1.2 meter height from the road surface and 7.5 meter sideways from the running centerline in the midpoint of the course. The results were indicated the reciprocal of the sound level using an index, wherein the tire of Ref 2 is being 100. The larger the value, the better the performance is.

Performance in Mud Terrain Test:

This test was conducted in the same manner as the first embodiment. The results were indicated using a score, wherein the Ref 2 is being 100. The larger the value, the better the performance is.

What is claimed is:

1. A pneumatic tire comprising:

a tread portion having a tread edge;

the tread portion provided with a circumferentially extending zigzag shoulder main groove arranged proximate to the tread edge, and a plurality of shoulder lateral grooves each extending axially outwardly from the shoulder main groove, wherein the shoulder main groove comprises a first inclined element and a second inclined element inclined in an opposite direction to the first inclined element;

each of the shoulder lateral grooves comprising a first portion and second portion;

the first portion having an axially inner end connected to the shoulder main groove and a first groove wall, wherein the first portion is connected to the first inclined element and is inclined in the same direction of the second inclined element;

the second portion arranged axially outward of the first portion and having a second groove wall, the second portion having a groove width and a groove depth greater than those of the first portion; and the first groove wall of the first portion and the second groove wall of the second portion being smoothly continuous so as to form a single groove wall or a common plane.

TABLE 2

|  | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Distance L1 (mm) | −8.0 | 0 | 2.0 | 4.0 | 6.0 | 2.0 | 2.0 | 2.0 | 2.0 | 2.0 | 2.0 |
| Angle θ1 (deg.) | 35 | 35 | 35 | 35 | 35 | 30 | 40 | 35 | 35 | 35 | 35 |
| Ratio of groove depth of first portion d1 to that of shoulder main groove (%) | 85 | 85 | 85 | 85 | 85 | 85 | 85 | 80 | 90 | 85 | 85 |
| Ratio W8/W7 (%) | 135 | 135 | 135 | 135 | 135 | 135 | 135 | 135 | 135 | 130 | 140 |
| Noise Performance (Index) | 100 | 110 | 115 | 115 | 115 | 120 | 110 | 120 | 110 | 120 | 110 |
| Mud performance (Score) | 100 | 100 | 100 | 95 | 90 | 95 | 105 | 95 | 105 | 95 | 105 |

2. The pneumatic tire according to claim 1,
wherein the respective angles of the first inclined element and the second inclined element are in a range of from 30 to 40 degrees with respect to a circumferential direction of the tire.

3. The pneumatic tire according to claim 1,
wherein the first inclined element comprises a narrow portion and a broad portion having a width greater than that of the narrow portion,
the broad portion is arranged axially outward of the narrow portion, and
the first portion is connected to the broad portion.

4. The pneumatic tire according to claim 1,
wherein the tread portion comprises a plurality of shoulder blocks each of which is arranged between the shoulder lateral grooves, each of the shoulder block is provided with a shoulder narrow groove having a groove width smaller than that of the first portion of each of the shoulder lateral grooves, and
the shoulder narrow groove extends along the shoulder lateral groove.

5. The pneumatic tire according to claim 4,
wherein at least one of the shoulder blocks is provided with a shoulder sipe having a width smaller than that of the shoulder narrow groove, and
the shoulder sipe is arranged axially inwardly of the shoulder narrow groove.

6. The pneumatic tire according to claim 5,
wherein the shoulder sipe is arranged so as to connect the shoulder main groove with the first portion of the shoulder lateral groove.

7. The pneumatic tire according to claim 5,
wherein the shoulder sipe is arranged so as to connect the shoulder main groove with the shoulder narrow groove.

8. The pneumatic tire according to claim 5,
wherein the shoulder sipe is arranged so as to connect the shoulder narrow groove with the first portion of the shoulder lateral groove.

9. The pneumatic tire according to claim 5,
wherein the shoulder sipe is arranged so as to connect among the shoulder main groove, the first portion of the shoulder lateral groove, and the shoulder narrow groove.

10. The pneumatic tire according to claim 1,
wherein the first portion of the shoulder lateral groove is connected to the first inclined element so as to form a T-shaped intersection.

11. The pneumatic tire according to claim 10,
wherein the axially inner end of the first portion of the shoulder lateral groove is located axially inward of an extension line of an axially inner groove edge of the second inclined element of the shoulder main groove.

12. The pneumatic tire according to claim 11,
wherein a distance between the extension line and the axially inner end of the first portion of the shoulder lateral groove is not more than 4.0 mm.

13. The pneumatic tire according to claim 1,
wherein the shoulder main groove comprises an axially outer zigzag peak, and
the axially outer zigzag peak comprises an axially outer groove edge extending along a circumferential direction of the tire.

14. The pneumatic tire according to claim 1,
wherein the first portion is inclined at an angle in a range of from 30 to 40 degrees with respect to a circumferential direction of the tire.

15. The pneumatic tire according to claim 2,
wherein the first inclined element comprises a narrow portion and a broad portion having a width greater than that of the narrow portion,
the broad portion is arranged axially outward of the narrow portion, and
the first portion is connected to the broad portion.

16. The pneumatic tire according to claim 2,
wherein the first portion of the shoulder lateral groove is connected to the first inclined element so as to form a T-shaped intersection.

17. The pneumatic tire according to claim 1,
wherein the shoulder main groove comprises an axially outer zigzag peak, and
the axially outer zigzag peak comprises an axially outer groove edge extending along a circumferential direction of the tire.

18. The pneumatic tire according to claim 1,
wherein the first portion is inclined at an angle in a range of from 30 to 40 degrees with respect to a circumferential direction of the tire.

19. A pneumatic tire comprising:
a tread portion having a tread edge;
the tread portion provided with a circumferentially extending zigzag shoulder main groove arranged proximate to the tread edge, and a plurality of shoulder lateral grooves each extending axially outwardly from the shoulder main groove;
each of the should lateral grooves comprising a first portion and a second portion;
the first portion having an axially inner end connected to the shoulder main groove and a first groove wall, wherein the first portion is inclined at an angle in a rage of from 30 to 40 degrees with respect to a circumferential direction of the tire;
the second portion arranged axially outward of the first portion and having a second groove wall, the second portion having a groove width and a groove depth greater than those of the first portion; and
the first groove wall of the first portion and the second groove wall of the second portion being smoothly continuous so as to form a single groove wall or a common plane.

\* \* \* \* \*